(12) United States Patent
Aritomi

(10) Patent No.: US 7,253,911 B2
(45) Date of Patent: Aug. 7, 2007

(54) PRINTING METHOD AND SYSTEM FOR EXECUTING PRINTING IN PLURAL PRINT PROCESSES

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/023,750

(22) Filed: Dec. 21, 2001

(65) Prior Publication Data

US 2002/0085226 A1 Jul. 4, 2002

(30) Foreign Application Priority Data

Dec. 25, 2000 (JP) .............................. 2000-393479
Dec. 19, 2001 (JP) .............................. 2001-386704

(51) Int. Cl.
*G06F 3/12* (2006.01)
(52) U.S. Cl. .................... 358/1.13; 358/1.18; 358/1.16; 358/451
(58) Field of Classification Search ............... 358/1.15, 358/1.18, 451, 1.16, 1.13, 1.17; 715/500; 399/361; 270/52.01
See application file for complete search history.

(56) References Cited

U.S. PATENT DOCUMENTS

| | | | |
|---|---|---|---|
| 5,442,732 A * | 8/1995 | Matysek et al. ............ | 358/1.17 |
| 5,481,353 A * | 1/1996 | Hicks et al. ................ | 399/382 |
| 6,373,588 B1 * | 4/2002 | Fischer et al. ............. | 358/1.16 |
| 6,512,592 B1 * | 1/2003 | Simpson et al. ........... | 358/1.15 |
| 6,552,814 B2 * | 4/2003 | Okimoto et al. ........... | 358/1.13 |
| 6,616,702 B1 * | 9/2003 | Tonkin ....................... | 715/515 |
| 2002/0066989 A1 * | 6/2002 | Simpson .................... | 270/52.01 |
| 2003/0103237 A1 * | 6/2003 | Han ........................... | 358/1.18 |

FOREIGN PATENT DOCUMENTS

| | | |
|---|---|---|
| EP | 0 889 390 | 1/1999 |
| EP | 0 889 390 A1 | 1/1999 |
| JP | 10-322487 | 12/1998 |
| JP | 11-143668 | 6/1999 |

OTHER PUBLICATIONS

Stephen W. Sagman, Running Microsoft Power Point 4 for Windows, 1994, Microsoft Press, p. 384.*

* cited by examiner

*Primary Examiner*—Aung S. Moe
*Assistant Examiner*—Vincent M. Rudolph
(74) *Attorney, Agent, or Firm*—Fitzpatrick, Cella, Harper & Scinto

(57) ABSTRACT

If a presentation mode to print a presentation material and a distribution material is selected and the number of copies of printing of the distribution material is set, a printing job is issued from a computer to a printer in accordance with the setting. Thus, on the basis of printing data included in the issued printing job, the printer prints the data of each of plural pages on a one transparent recording sheet in color as the presentation material, and further prints the data of predetermined number of pages in monochrome for the number of copies of printing set so that the data of the predetermined number of pages are put on a one plane paper as the distribution material.

7 Claims, 11 Drawing Sheets

FIG. 13

DETAILS OF DISTRIBUTION MATERIAL

COLOR MODE OF DISTRIBUTION MATERIAL

1301 — ◉ MONOCHROME

1302 — ○ COLOR

LAYOUT OF DISTRIBUTION MATERIAL

| 4 IN 1 ▼ | — 1303

STAPLING

1304 — ◉ YES

1305 — ○ NO

1307 — [RETURN TO STANDARD]

1306 — [ OK ]  [ CANCEL ]

PRINTING METHOD AND SYSTEM FOR EXECUTING PRINTING IN PLURAL PRINT PROCESSES

BACKGROUND OF THE INVENTION

1. Field of the Invention

The present invention relates to a printing method in a printing control system composed of a host computer, a printer and the like.

2. Related Background Art

Conventionally, in a printing control system to which a host computer and a printer are connected, if plural finishing processes are designated by an application program (simply called an application hereinafter) running on the host computer and printing is then executed, it is necessary to designate each finishing process and then execute the printing plural times.

For example, in such a case where color printing on an OHP (overhead projector) sheet for presentation and monochrome printing for materials to be distributed are executed, the printing on the OHP sheet is first executed once, and separately, after printing setting by a printer driver or an application is changed, the printing is executed again.

As described above, in the conventional printing control system, there is a problem that a printing operation greatly complicates because a print to which plural finishing processes and color processes have been executed can not be output in a printing job of one time.

SUMMARY OF THE INVENTION

An object of the present invention is to provide a printing control method which eliminates such an inconvenience as described above.

Another object of the present invention is to provide a printing control method or the like which enables to output a print to which plural finishing processes and color processes have been executed in a printing job of one time.

Other objects of the present invention will be apparent from the following description and the claims based on the attached drawings.

BRIEF DESCRIPTION OF THE DRAWINGS

FIG. 13 is a diagram showing a printing detail setting screen for a distribution material.

DETAILED DESCRIPTION OF THE PREFERRED EMBODIMENTS

Hereinafter, the embodiments of the present invention will be explained with reference to the attached drawings.

Figure 1:
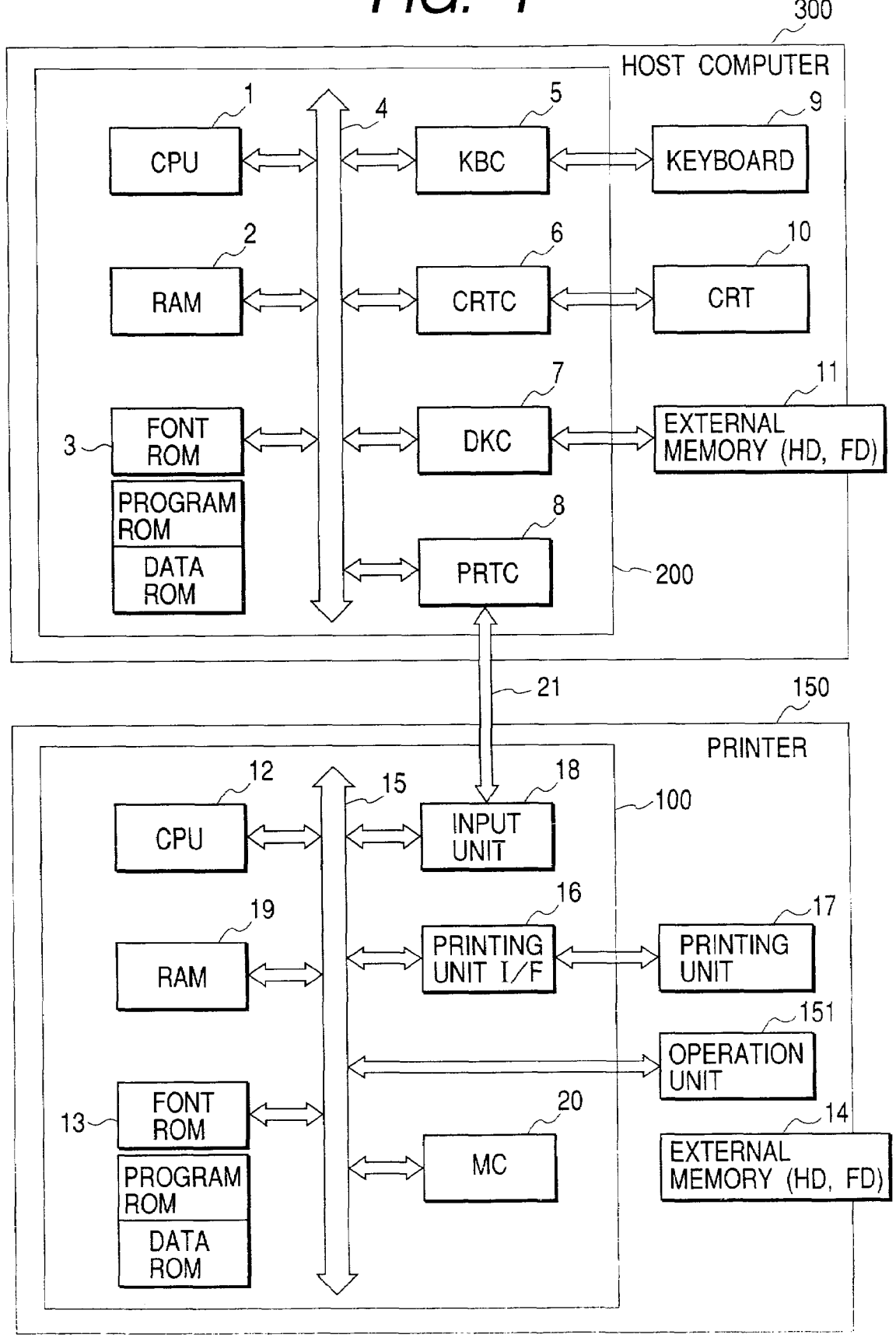
FIG. 1 is a block diagram showing the structure of a printing control system.

FIG. 1 is a block diagram showing the structure of a printing control system according to the embodiment of the present invention.

The printing control system is composed of a host computer 300 and a printer 150. The host computer 300 includes a CPU (central processing unit) 1. The CPU 1 executes a document (or text) process to mixedly handle figures, images, characters, tables (including spreadsheets or the like), and the like, on the basis of a document processing program stored in a program ROM (read-only memory for programs) in a ROM 3 or an external memory (HD (hard disk), FD (floppy disk) or the like) 11. Moreover, the CPU 1 collectively controls respective devices which are connected to a system bus 4 in a section 200.

Further, an OS (operating system program) and the like being control programs of the CPU 1 have been stored in the program ROM of the ROM 3 or the external memory 11, font data and the like used in the document process have been stored in a font ROM (read-only memory for fonts) of the ROM 3 or the external memory 11, and other various data used in the document process and the like have been stored in a data ROM (read-only memory for various data) of the ROM 3 or the external memory 11.

Numeral 2 denotes a RAM (random-access memory) which functions as a main memory, a working area and the like for the CPU 1, numeral 5 denotes a KBC (keyboard controller) which controls key input and the like from a keyboard 9 and a not-shown pointing device, and numeral 6 denotes a CRTC (cathode ray tube controller) which controls accessing to the external memory 11 which stores therein display of a CRT (cathode ray tube) display (simply called CRT hereinafter) 10. Numeral 7 denotes a DKC (diskette controller) which controls a boot program, various application, the font data, user files, editing files, a printer control command generation program (called a printer driver hereinafter) and the like. The external memory 11 includes the HD and the FD, and the like.

Numeral 8 denotes a PRTC (printer controller) which is connected to the printer 150 through a predetermined bidirectional interface 21 and executes a communication control process with the printer 150. It should be noted that the CPU 1 executes, e.g., an expansion (rasterizing) process of display information set on the RAM 2 into outline font, and enables WYSIWYG (what you see is what you get) editing on the CRT 10. Further, the CPU 1 opens various registered windows in response to a command indicated and issued by using a mouse cursor or the like displayed on the CRT 10, and thus executes various data processes. Therefore, when a printing operation is executed, a user can open the window concerning the setting of the printing and thus execute the setting of a printing process manner for the printer driver including selection of a printing mode.

On the other hand, the printer 150 includes a printer CPU 12. The printer CPU 12 outputs an image signal functioning as output information to a printing unit (printer engine) 17 connected to a system bus 15 in a section 100 through an printing unit I/F (interface) 16, on the basis of a control program or the like previously stored in a program ROM (ROM for programs) in a ROM 13 or a control program or the like previously stored in an external memory (HD, FD or the like) 14. Further, the control program and the like of the CPU 12 have been stored in the program ROM of the ROM 13, font data and the like used to generate the output information have been stored in a font ROM of the ROM 13, and other various data used on the host computer 300 have been stored in a data ROM of the ROM 13 in case of the printer 150 not using the external memory 14 such as an HD or the like.

The CPU 12 can execute a communication process with the host computer 300 through an input unit 18, and thus can notify the host computer 300 of various data and information and the like in the printer 150. Numeral 19 denotes a RAM which functions as a main memory, a working area and the like for the CPU 12. The RAM 19 is structured to be able to enlarge its memory capacity by adding an optional RAM connected to an expanded port (not shown).

The RAM 19 is used as an output information expansion area, an environmental data storage area, an NVRAM (non-volatile random-access memory), and the like. Accessing to the above external memory 14 such as the HD, an IC card or the like is controlled by an MC (memory controller) 20. The external memory 14 which is connected to the section 100 as an option stores font data, an emulation program, form data and the like. The input unit 18 functions as, e.g., an operation panel on which switches, LED (light-emitting diodes) displays and the like used to operate the printing control system are disposed.

The printer 150 includes at least the one external memory 14 or more. Moreover, the printer 150 may be structured, so that plural option font cards in addition to built-in fonts, and plural external memories which store programs to interpret printer control languages of different language systems are connected. Besides, the printer 150 may be structured to include a not-shown NVRAM which stores printer mode setting information supplied from an operation panel 151.

Figure 2:
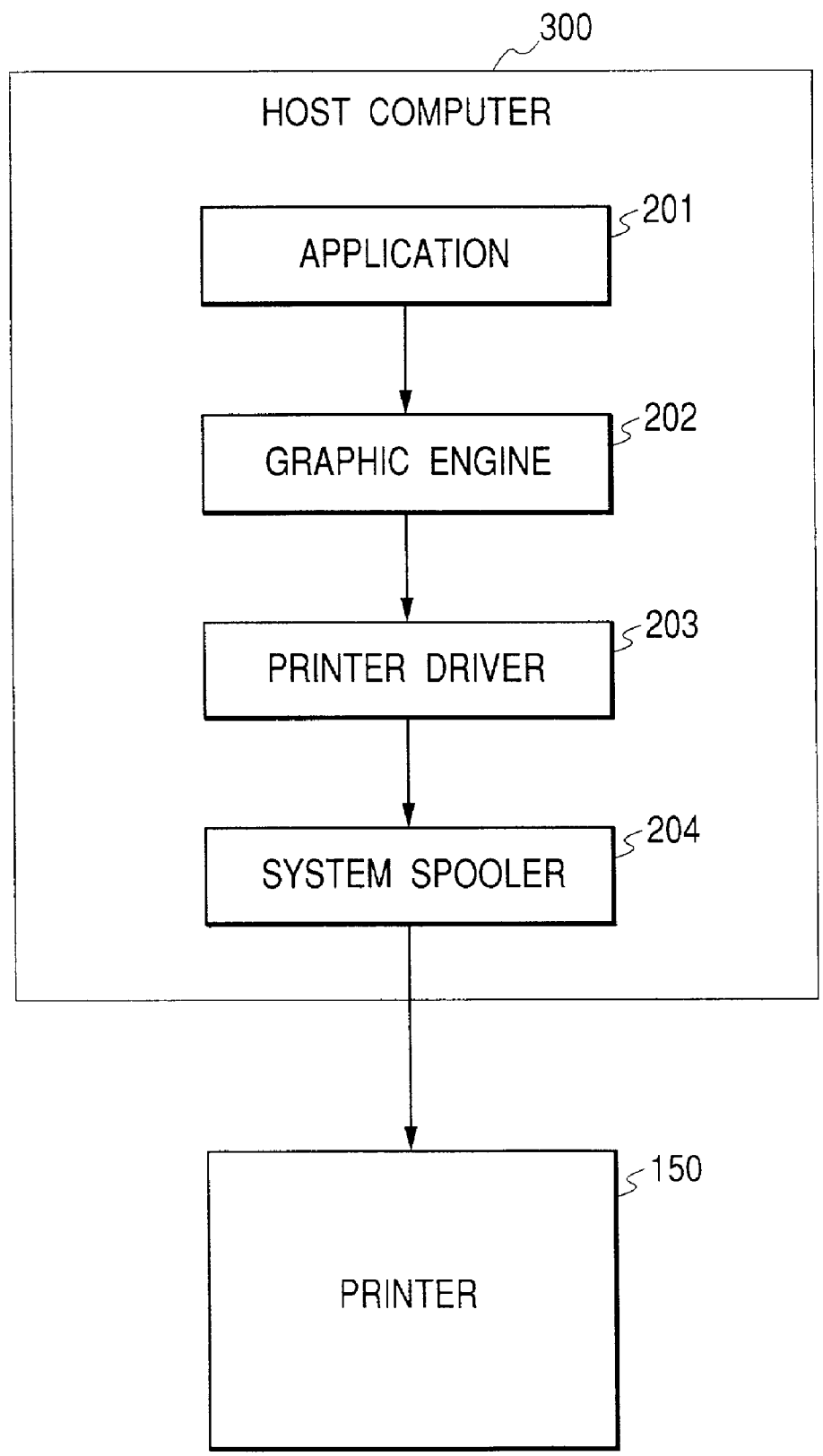
FIG. 2 is a block diagram showing a typical printing process in a host computer.

FIG. 2 is a block diagram showing a typical printing process in the host computer 300.

It should be noted that a printing apparatus such as the printer 150 or the like is connected to the host computer 300 directly or through a network.

An application 201, a graphic engine 202, a printer driver 203 and a system spooler 204 which all exist as files to be stored in the external memory 11 are program modules which are loaded to the RAM 2 and then executed by the OS and other modules. The application 201 and the printer driver 203 can be additionally stored in the external memory (HD) 11 through an FD, a CD-ROM or a not-shown network.

The application 201 stored in the external memory 11 is loaded to the RAM 2 and then executed, whereby the printing is executed on the basis of the loaded application 201. At this time, image output (drawing) is executed by using the graphic engine 202 which is executable similarly by the loading to the RAM 2. The graphic engine 202 is used to similarly load the printer driver 203 prepared for each printer from the external memory 11 to the RAM 2, and then convert the output based on the application 201 into a printer control command for the printer 150 with use of the loaded printer driver 203. The obtained printer control command is managed by the system spooler 204 which was loaded to the RAM 2 by the OS, and then output to the printer 150 through the bidirectional interface 21.

Figure 3:
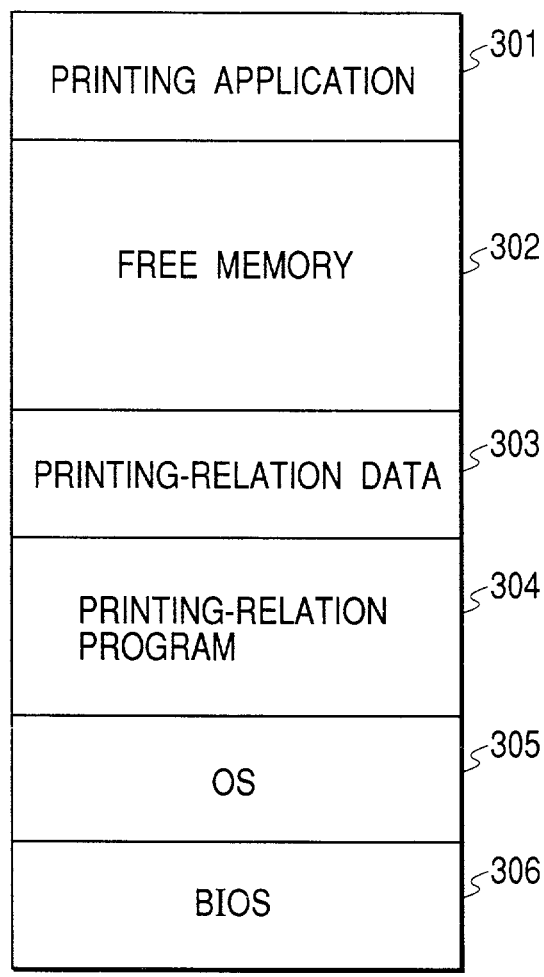
FIG. 3 is a diagram showing a memory map.

FIG. 3 is a diagram showing a memory map in the state that printing-relation modules (i.e., the program modules relative to the printing) including the printing program according to the embodiment have been loaded to the RAM 2 on the host computer 300 and are thus executable.

In FIG. 3, numeral 301 denotes a printing application (i.e., the application for the printing), numeral 302 denotes a free memory, numeral 303 denotes printing-relation data (i.e., the data relative to the printing), numeral 304 denotes printing-relation programs (i.e., the programs relative to the printing), numeral 305 denotes the OS, and numeral 306 denotes a BIOS (basic input/output system). It should be noted that the printing-relation program in the embodiment exists as a part of the printing-relation programs 304.

Hereinafter, an operation in the embodiment will be explained with reference to flow charts shown in FIGS. 4, 5, 6 and 7.

Figure 4:
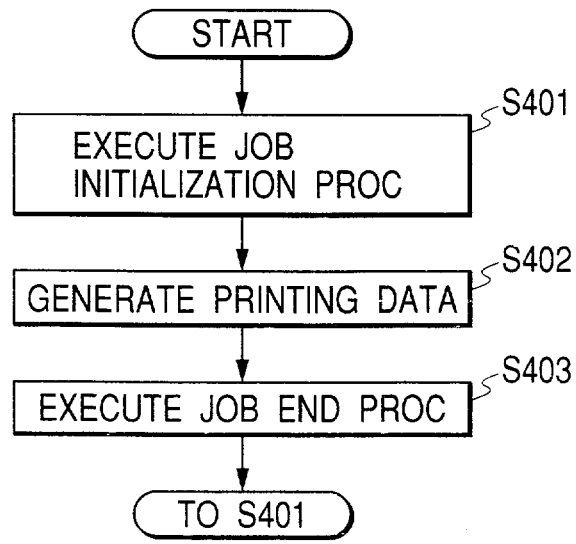
FIG. 4 is a flow chart showing the printing process on the host computer.
Figure 5:
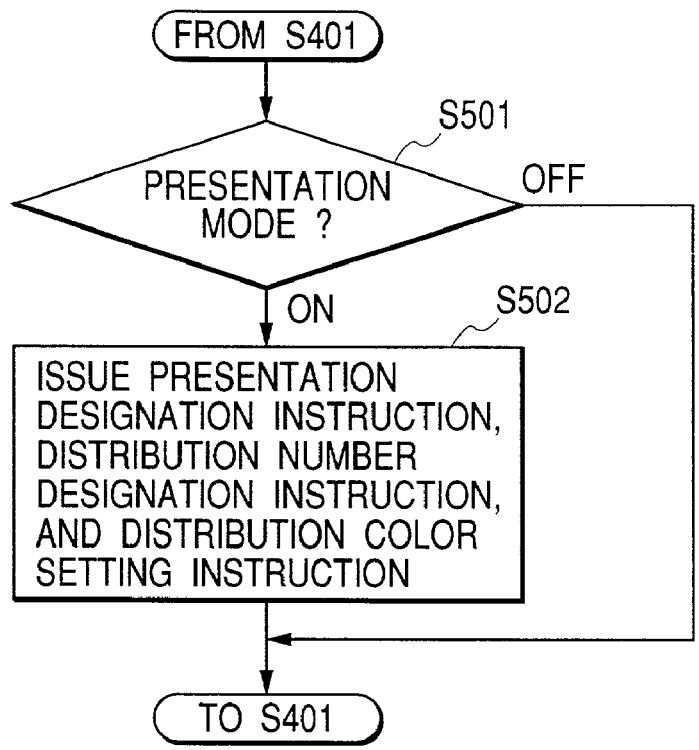
FIG. 5 is a flow chart showing the process on the host computer when a presentation mode is selected.
Figure 6:
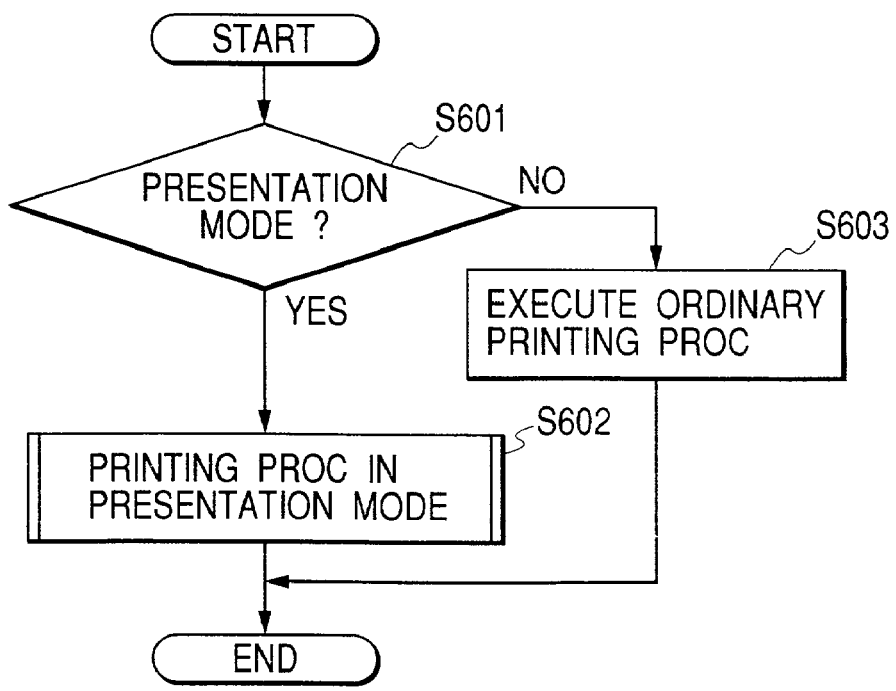
FIG. 6 is a flow chart showing a partial process of the printing process on a printer.
Figure 7:
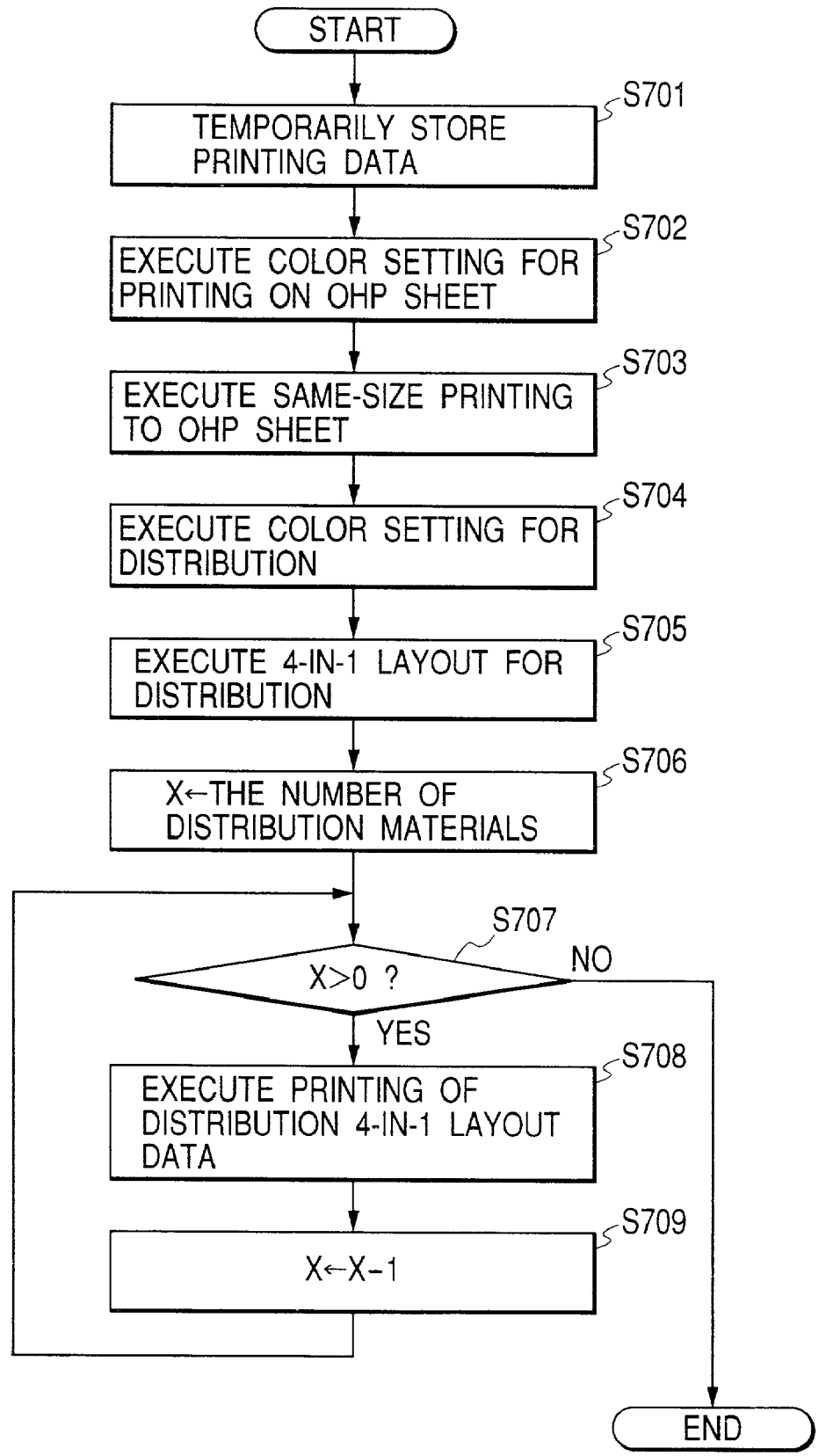
FIG. 7 is a flow chart showing in detail the process of FIG. 6 when the presentation mode is selected.

Here, FIG. 4 is the flow chart showing the printing process on the host computer 300 according to the embodiment, FIG. 5 is the flow chart showing the process on the host computer 300 according to the embodiment when a presentation mode is selected, FIG. 6 is the flow chart showing the process in a judgment unit, on the printer 150 according to the embodiment, which judges whether the printing should be executed in the presentation mode or in an ordinary (or another) mode, and FIG. 7 is the flow chart showing in detail the process of FIG. 6 when the presentation mode is selected.

Incidentally, if the programs according to the flow charts shown in FIGS. 4 and 5 are stored in the external memory 11 or the like of the host computer 300 and then executed, the following control method on the host computer 300 can be achieved. On the other hand, if the programs according to the flow charts shown in FIGS. 6 and 7 are stored in the external memory 14 or the like of the printer 150 and then executed, the following control method on the printer 150 can be achieved.

In the embodiment, the printing in the presentation mode is mentioned as one example of plural printing finishing processes according to the present invention. Here, it should be noted that the presentation mode is the mode that the printing of data used as a presentation material onto an OHP sheet and the printing of data used as a distribution material onto a recording sheet of paper (simply called a recording paper or a plane paper hereinafter) are collectively executed by a one-time printing operation, the presentation material is the material to be used in presentation, and the distribution material is the material to be distributed to attendance or the like. Besides, it should be noted that the data of plural pages are reduced in size and laid out (i.e., N-in-1 layout) on the one recording paper to produce the distribution material. Here, the N-in-1 layout is assumed that N images are appropriately laid out on one sheet.

Figure 8:
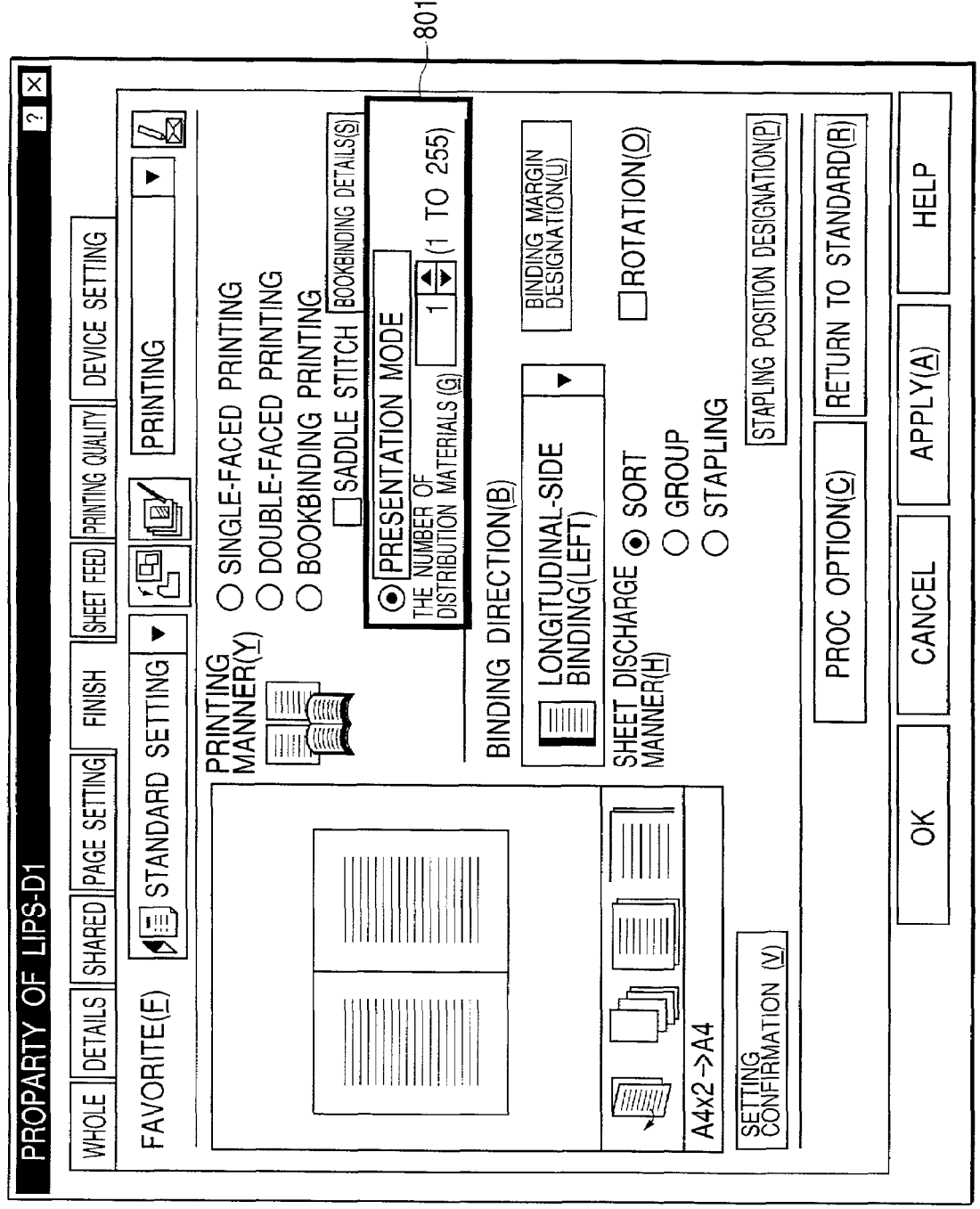
FIG. 8 is a diagram showing a printing setting screen.

The printing process in the embodiment starts if the user designates the printer 150 as a printing destination and further instructs to execute the printing in the presentation mode by using the keyboard 9 and the like. Such an instruction is loaded to the RAM 2 by the KBC 5 or the like shown in FIG. 1 under the control of the OS 305 as shown in FIG. 8, and the loaded instruction is executed by the running application 201. For example, if plural kinds of finishing manners and their accompanied color outputs are instructed, the printing process according to the present invention is executed.

As shown in the flow charts of FIGS. 4 and 6, the main flow of the printing process according to the embodiment is divided roughly into the process of generating the printing data on the host computer 300 and the process of executing, after receiving the generated printing data from the host computer 300, the printing in the designated finishing manner on the printer 150. It should be noted that the user need not execute the printing setting process, and in such a case, a printing process is executed afterward on the basis of default setting or printing setting previously set.

First of all, the printing data generation process on the host computer 300 will be explained with reference to FIGS. 4 and 5.

If the printing execution is instructed based on the application 201, roughly, a job initialization process is first executed (step S401), printing data actually used in drawing is then generated (step S402), and a job end process is finally executed (step S403).

Figure 9:
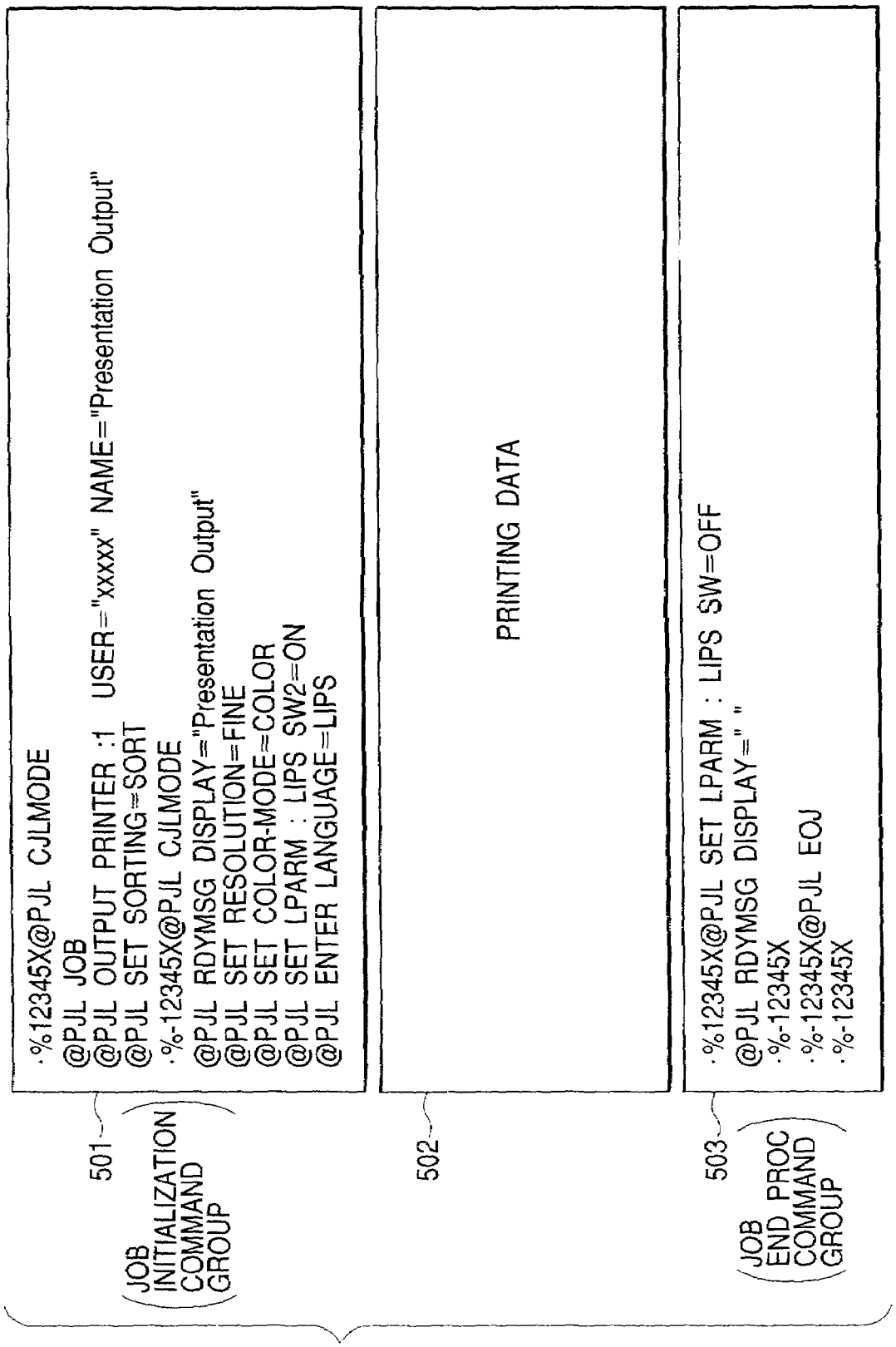
FIG. 9 is a diagram showing an example of contents of printing data generated when normal printing is executed.

An example of the printing data generated by such the serial processes is shown in FIG. 9. This example of FIG. 9 shows that a printing job is composed of a job initialization command group 501, a job end process command group 503 and other printing data 502.

Next, in the job initialization process (step S401), the process characterized by the embodiment will be explained with reference to the flow chart shown in FIG. 5.

While the job initialization process is being executed, the flow advances from the step S401 to a step S501 to judge whether or not the presentation mode has been set. As shown in FIG. 8, the presentation mode is set according as the user handles by the keyboard and the like the printer driver setting screen displayed on the CRT 10.

Concretely, in the setting screen of FIG. 8 according to the embodiment, the presentation mode is selected from the indicated printing manners including single-faced printing, double-faced printing, bookbinding printing and the presentation mode (a section 801 in FIG. 8). Further, at this time, the number of copies of printing of the distribution material which is subjected to N-in-1 printing is designated simultaneously. If the presentation mode is not set, the flow directly returns from the step S501 to the step S401 at once.

Figure 10:
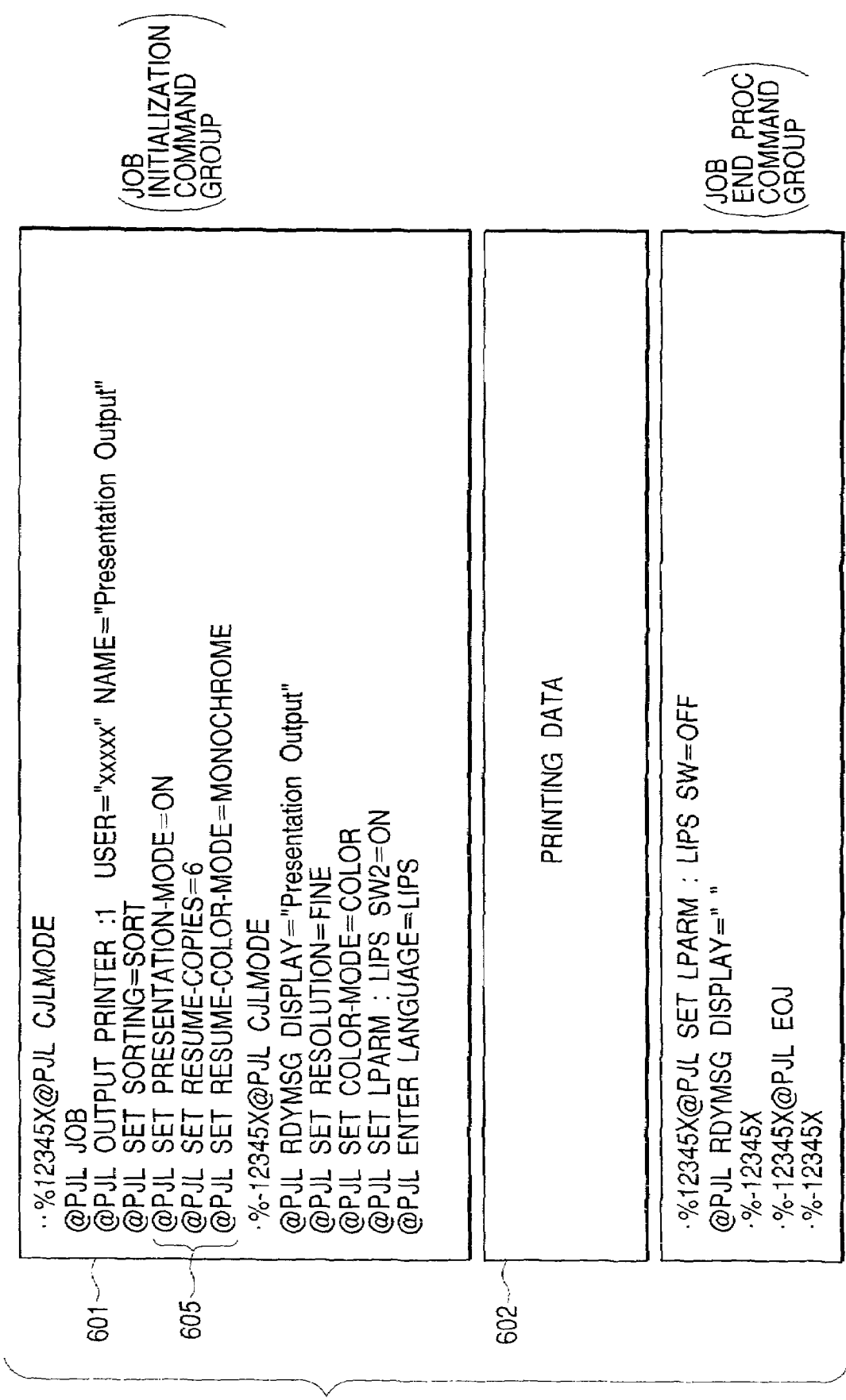
FIG. 10 is a diagram showing an example of contents of printing data generated when the presentation mode is selected in the embodiment.

On the other hand, if the presentation mode is set, a presentation designation instruction, a distribution number designation instruction (i.e., an instruction to designate the number of distribution copies) and a distribution color setting instruction all included in additional commands 605 of a job initialization command group 601 shown in FIG. 10 are issued (step S502).

That is, in an example shown in FIG. 10, a command "@PJL SET PRESENTATION-MODE=ON" indicates the presentation designation instruction, and a command "@PJL SET RESUME-COPIES=6" indicates the distribution number designation instruction. In this case, the number of the distribution copies is "6".

Further, a command "@PJL SET RESUME-COLORMODE=MONOCHROME" indicates the distribution color setting instruction. In this case, the distribution material is printed in monochrome. In any case, color printing and monochrome printing are appropriately switched to each other on the basis of this instruction. That is, the monochrome printing is executed if the command "=MONOCHROME" is instructed, the color printing is executed if the command "=COLOR" is instructed, and the color printing and the monochrome printing are automatically discriminated according to the data contents of each page and thus an output operation is changed if the command "=AUTO" is instructed.

Although the color output manner on the side of the OHP sheet accords to a specification in the color setting designated as an ordinary job, also appropriate parameters can be set as expansion in a presentation designation instruction. If a distribution color setting instruction is omitted, default at this time completely accords to color setting in an ordinary job. Incidentally, the monochrome printing may be set as default for the distribution material. In the explanation, the color setting is changed. However, if the color mode can not be changed or switched internally between the OHP film and the distribution material, the color change process when the distribution material is created can be of course omitted.

After the above three designation instructions were issued, the flow returns to the step S401.

The printing job which was generated by the host computer 300 according to the above process is sent to the printer 150 through the bidirectional interface 21 of FIG. 1. Then, the printing process based on the application completely ends, whereby the process based on the printing program in the embodiment ends as a whole, and then the printing job on the RAM 2 is deleted by using the function of the OS 305.

The host computer 300 and the printer 150 may be united with each other. In this case, the bidirectional interface 21 may be an internal bus, or may be an external interface such as a Centronics interface, a USB (universal serial bus), an IEEE1394 interface, a network or the like.

Next, the printing process on the printer 150 will be explained with reference to the flow charts shown in FIGS. 6 and 7.

Figure 11:
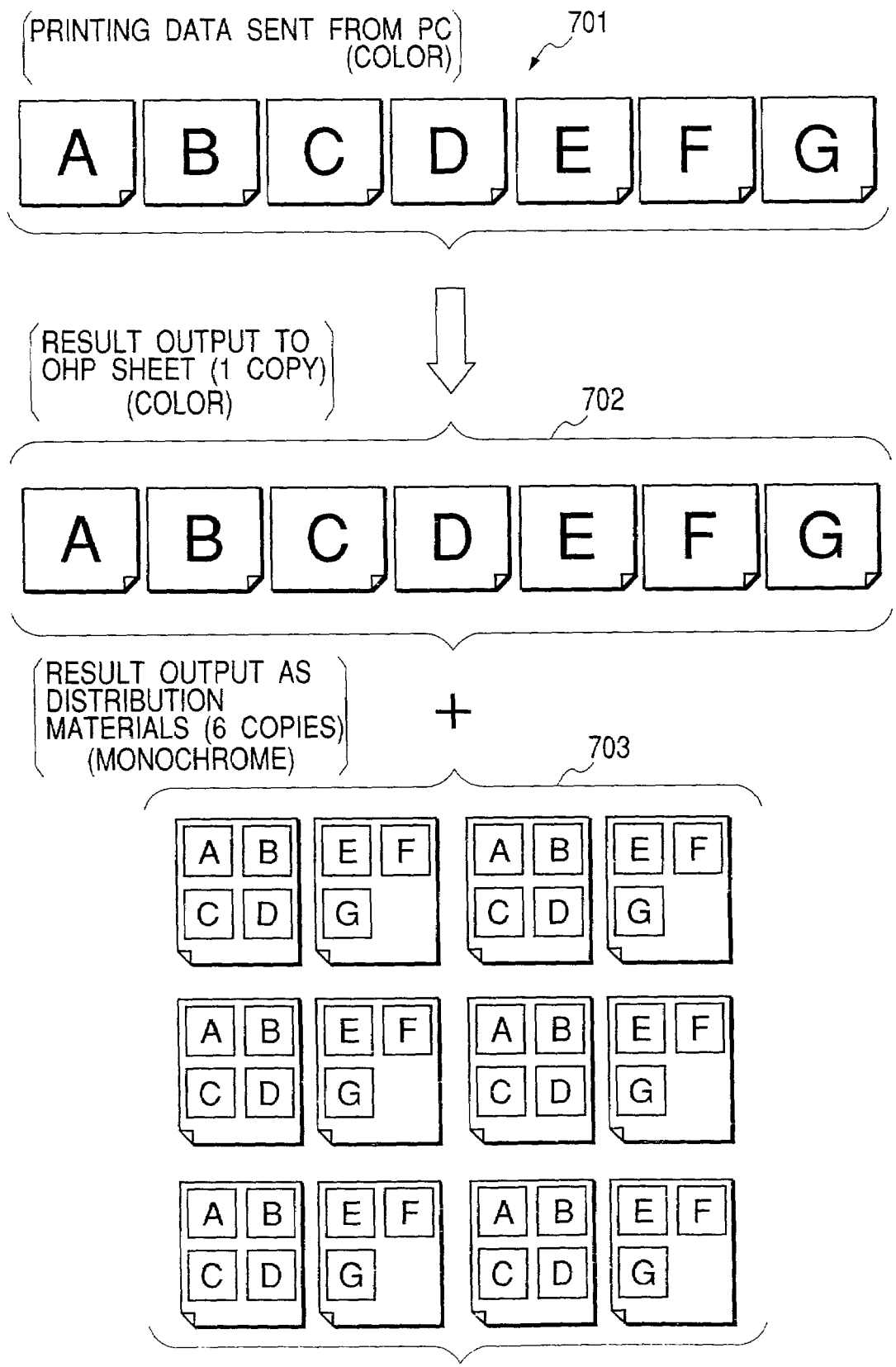
FIG. 11 is a diagram showing a result of the printing process in the presentation mode of the embodiment.

In the embodiment, presentation data (i.e., data for presentation) 701 of FIG. 11 including data of seven pages is used as an example of the printing data generated on the host computer 300.

The printing data sent from the host computer 300 is first interpreted to judge whether or not the designation of the presentation mode is included in the initialization command group (step S601). If judged that the designation of the presentation mode is not included, the ordinary printing process to be executed in the case where the presentation mode is not set is executed (step S603), and then the printing process ends. In the example of the printing data shown in FIG. 11, the presentation data 701 of seven pages sent from the host computer 300 is output as it is, whereby prints 702 of seven pages are obtained.

On the other hand, if judged that the designation of the presentation mode is included, the process in the presentation mode is executed (step S602). The details of this process is shown in the flow chart of FIG. 7.

First, a part corresponding to printing data 602 of FIG. 10 included in the printing data sent from the host computer 300 is temporarily stored in the RAM 19 or the hard disk on the printer 150 (step S701). Then, color setting is executed by using the printing data temporarily stored in the step S701 (step S702), and same-size printing is executed to the OHP sheet (step S703). In the embodiment, the printing to the OHP sheet is surely executed on the condition that the OHP sheet has been set to the sheet feeder (e.g., a manual feed tray) previously designated by the user. At this time, the temporarily stored printing data is still maintained.

Next, like the step S702, color setting is again executed on the basis of the temporarily stored printing data (step S704), and printing images 703 for distribution each of which has N-in-1 layout (4-in-1 in this case) are generated (step S705). Besides, the number of the distribution copies designated by the command "@PJL SET RESUME-COPIES=6" is substituted for a variable X for a process of the number of distribution copies set by the printing process program of the printer 150 (step S706).

After then, the distribution material is printed by using the 4-in-1 layout data generated in the step S705, and the copies the number of which is equivalent to the number of the copies designated in steps S707, S708 and S709 are produced. After the above process ended, the printing process ends as a whole.

FIG. 11 shows an example of the result of the printing process in the presentation mode according to the embodiment. The printing data 701 of seven pages sent from the host computer 300 (the steps S701 and S702) is first same-size output to the OHP sheet to produce the prints 702 of seven pages (the step S703), and subsequently the six copies 703 of prints each of which has two pages each including the 4-in-1 layout images are output as the distribution material (the steps S704, S705, S706, S707, S708 and S709).

As above, in the embodiment, the instruction for the plural different finishing processes is added to the printing information of one job, the obtained printing information is sent from the host computer 300 to the printer 150, and then the sent printing information is collectively processed (i.e., batched) on the side of the printer 150, whereby various finishing processes and color processes can be executed at high speed.

In the above embodiment, the color image is formed on the OHP sheet, while the monochrome image is formed on a common sheet (the recording paper) as the distribution material. However, it is possible to select color image formation for the distribution material.

Figure 12:
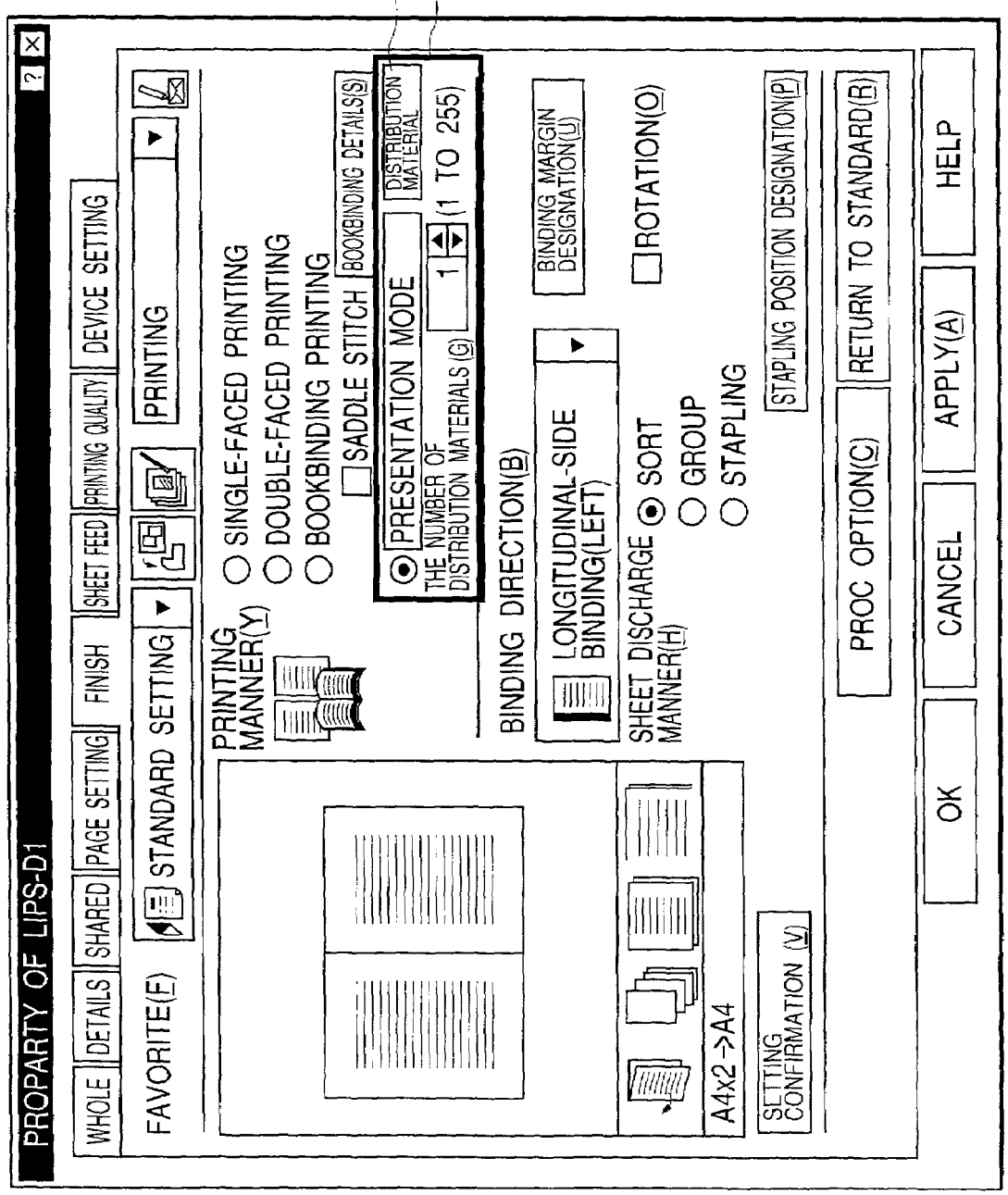
FIG. 12 is a diagram showing the printing setting screen.

That is, as shown in FIG. 12, a distribution material button 802 can be provided in the section 801. Then, if the distribution material button 802 is depressed in the state that the presentation mode has been selected, a screen for setting the details of the distribution material is displayed as shown in FIG. 13. In FIG. 13, numeral 1301 denotes a selection part which is selected when the distribution material is printed in monochrome, and numeral 1302 denotes a selection part which is selected when the distribution material is printed in color (i.e., when the distribution material is printed in the color same as that used in the printing for the OHP sheet). In the default state, the monochrome printing has been selected.

Numeral 1303 denotes a button which is used to select the layout of the distribution material. For example, when the button 1303 is depressed, plural kinds of layouts such as "2-in-1", "3-in-1", "4-in-", "6-in-1", "8-in-1" and the like are displayed in the form of pull-down menu, whereby the user can select the desired layout. Besides, it should be noted that a mode to print one image on one recording paper can be selected. In the default state, the "4-in-1" layout has been selected.

Numeral 1304 denotes a selection part which is selected when stapling is executed to the distribution material, and numeral 1305 denotes a selection part which is selected when the stapling is not executed to the distribution material. If the printer 150 is equipped with a stapling function, the stapling has been selected in the default state. On the other hand, if the printer 150 is not equipped with the stapling function, any selection operation using the parts 1304 and 1305 can not be executed. Besides, even if the stapling is selected, any stapling is not executed to the OHP sheet. Numeral 1307 denotes a button which is depressed to return the above items to a standard state.

If an OK button 1306 is depressed, the selected items are set, and then the printing job is issued according to the set items.

In the above embodiment, the storage medium which stores the printing program running on the host computer 300 was described as the external memory. Here, as such the storage medium, an FD, an HDD, a CD-ROM, an IC memory card or the like can be used. Besides, it is possible to record in the ROM 3 the printing program alone or together with the OS or other programs running on the host computer 300 so that the printing program becomes a part of a memory map, whereby the CPU 1 can directly execute the printing program.

Further, the printing program which was described as the program to be executed on the printer 150 is the same as the printing program to be executed on the host computer 300. Besides, it is possible to execute the printing program itself on the host computer 300 so that the printing image generated by the host computer 300 is sent to the printing unit 17 of the printer 150 through the printing unit I/F 16. Thus, a printing control system different from the printing control system in the embodiment can be structured.

Further, in the above embodiment, as the finishing processes, the color printing process which is executed for the OHP sheet used in the presentation, and the monochrome and color printing processes which are executed to the images laid out for the distribution material were explained. However, other processes can be executed as the finishing processes. For example, a process to print, like an album, plural images taken by a digital camera, a process to print the plural images taken by the digital camera respectively on different recording materials, and the like can be executed as the finishing process.

As described above in detail, it is possible to provide the user with the printed output to which the plural finishing processes have been executed in the one-time printing process without troubling the user.

Further, since the plural finishing processes are achieved by the one-time printing process, it is possible to decrease a traffic load given to the data transfer line (e.g., Internet) between the host apparatus and the printer apparatus, by sending the printing data for each job.

What is claimed is:

1. A control method for a printing system, the printing system including an information processing apparatus and a print device, the information processing apparatus having a printer driver designated a presentation mode as a print setting and the print device capable of executing an ordinary print process or a presentation-mode print process which makes presentation material and distribution material, the method comprising:

performing by the information processing apparatus:
a job issue step of issuing a single print job according to print setting set by a user via Graphical User Interface of the printer driver; performing by the print device:
a judgment step of judging whether or not the single print job contains a specific command which designates the presentation mode; a step of, in a case where it is judged in said judgment step that the single print job does not contain the specific command, executing an ordinary print process; and a step of, in a case where it is judged in said judgment step that the single print job contains the specific command, executing the presentation-mode print process which makes presentation material and the distribution material from presentation material data included in the single print job corresponding to the specific command in the single print job that designates the presentation mode, wherein said information processing apparatus adds the specific command that designates the presentation mode to the single print job, the specific command is a command to designate the presentation-mode print process, a command to designate the number of copies of the distribution material made from the presentation material data included in the single print job, and a color setting command of the distribution material, and wherein, in the case where the presentation-mode print process is executed, said method further comprising:

performing by the print device:

a step of temporarily storing print data of the print job in a memory of a print device; a step of executing color setting of the presentation material according to the temporarily stored print data, and a step of printing the presentation material;

a step of executing color setting of the distribution material according to the temporarily stored print data, and a step of executing an N-in-1 layout process for the distribution material; a step of setting the number of copies set for the distribution material, as the number of prints; and a step of printing the distribution material based on said step of executing the color setting of the distribution material, said step of executing the N-in-1 layout process and said step of setting the number of prints.

2. A control method for the printing system according to claim 1, wherein each of said step of executing the color setting of the presentation material and said step of executing the color setting of the distribution material is a step of selecting either monochrome printing or color printing.

3. A control method for for the printing system according to claim 1, further comprising a stapling execution step of executing stapling, wherein said step of printing the presentation material is adapted to execute the printing on a transparent sheet, and wherein said stapling execution step is adapted, even if it is instructed to execute the stapling, not to execute the stapling of the presentation material but to execute the stapling of the distribution material.

4. A computer-readable storage medium which stores a program capable of execution by a computer for a control method for a printing system, the printing system including an information processing apparatus and a print device, the information processing apparatus having a printer driver designated presentation mode as a print setting and the print device capable of executing an ordinary print process or a presentation-mode print process which makes presentation material and a distribution material, the method comprising:

performing by said information processing apparatus:

a job issue step of issuing a single print job according to print setting set by a user via Graphical User Interface of the printer driver; performing by said print device: a judgment step of judging whether or not the single print job contains a specific command which designated the presentation mode; a step of, in a case where it is judged in said judgment step that the single print job does not contain the specific command, executing an ordinary print process; and a step of, in a case where it is judged in said judgment step that the single print job contains the specific command, executing the presentation-mode print process which makes presentation material and the distribution material from presentation material data included in the single print job corresponding to the specific command in the single print job that designates the presentation mode, wherein said information processing apparatus adds the specific command that designates the presentation mode to the single print, the specific command is a command to designate the presentation-mode print process, a command to designate the number of copies of the distribution material made from the presentation material data included in the single print job, and a color setting command of the distribution material, and wherein, in the case where the presentation-mode print process is executed, said method further comprising:

performing by the print device:

a step of temporarily storing print data of the print job in a memory of a print device; a step of executing color setting of the presentation material according to the temporarily stored print data, and a step of printing the presentation material;

a step of executing color setting of the distribution material according to the temporarily stored print data, and a step of executing an N-in-1 layout process for the distribution material; a step of setting the number of copies set for the distribution material, as the number of prints; and a step of printing the distribution material based on said step of executing the color setting of the distribution material, said step of executing the N-in-1 layout process and said step of setting the number of prints.

5. A printing system, the printing system including an information processing apparatus and a print device, the information processing apparatus having a printer driver designated a presentation mode as a print setting and the print device capable of executing an ordinary print process or a presentation-mode print process which makes presentation material and distribution material, the information processing apparatus comprising a job issue unit adapted to issue a single print job according to print setting set by a user via Graphical User Interface of the printer driver; and the print device comprising:

a judgment unit adapted to judge whether or not the single print job contains a specific command which designates the presentation mode;

a unit adapted to, in a case where it is judged by said judgment unit that the single print job does not contain the specific command, execute an ordinary print process; and a unit adapted to, in a case where it is judged by said judgment unit that the single print job contains the specific command, execute the presentation-mode print process which makes the presentation material and the distribution material from presentation material data included in the single print job corresponding to the specific command in the single print job that designates the presentation mode, wherein said information processing apparatus adds the specific command that designates the presentation mode to the single print job, the specific command is a command to designate the presentation-mode print process, a command to designate the number of copies of the distribution material made from the presentation material data included in the single print job, and a color setting command of the distribution material, and wherein, in the case where the presentation-mode print process is executed, said print device further comprises:

a unit adapted to temporarily store print data of the print job in a memory of said print device;

a unit adapted to execute color setting of the presentation material according to the temporarily stored print data, and a unit adapted to print the presentation material;

a unit adapted to execute color setting of the distribution material according to the temporarily stored print data, and a unit adapted to execute an N-in-1 layout process for the distribution material;

a unit adapted to set the number of copies set for the distribution material, as the number of prints; and a unit adapted to print the distribution material based on the color setting executed by said unit adapted to execute the color setting of the distribution material, the N-in-1 layout process executed by said unit adapted to execute the N-in-1 layout process, and the number of prints set by said unit adapted to set the number of prints.

6. A print system according to claim 5, wherein each of said unit adapted to execute the color setting of the presentation material and said unit adapted to execute the color setting of the distribution material is a unit adapted to select either monochrome printing or color printing.

7. A print system according to claim 5, said print device further comprising a stapling execution unit adapted to execute stapling, wherein said unit adapted to print the presentation material executes the printing on a transparent sheet, and wherein, even if it is instructed to execute the stapling, said stapling execution unit does not execute the stapling of the presentation material but executes the stapling of the distribution material.

* * * * *

UNITED STATES PATENT AND TRADEMARK OFFICE
CERTIFICATE OF CORRECTION

| | |
|---|---|
| PATENT NO. | : 7,253,911 B2 |
| APPLICATION NO. | : 10/023750 |
| DATED | : August 7, 2007 |
| INVENTOR(S) | : Aritomi |

It is certified that error appears in the above-identified patent and that said Letters Patent is hereby corrected as shown below:

TITLE SHEET:
(56) Foreign Patent Documents, "EP    0889    390    1/1999" should be deleted.

SHEET 6:
FIG. 8, "PROPARTY" should read -- PROPERTY --.

SHEET 10:
FIG. 12, "PROPARTY" should read -- PROPERTY --.

COLUMN 1:
Line 27, "complicates" should read -- becomes complicated --.

COLUMN 2:
Line 44, "tron," should read -- tions, --.

COLUMN 5:
Line 25, "as" should read -- the way --; and
Line 26, "handles by the keyboard and the like" should read -- handles the keyboard and the like to direct --.

COLUMN 6:
Line 44, "is shown" should read -- are shown --.

COLUMN 8:
Line 47, "performing" should read -- ¶ (new paragraph) performing --.

COLUMN 9:
Line 8, "data," should read -- data; --;
Line 25, "for" (second occurrence) should be deleted;
Line 47, "performing" should read -- ¶ (new paragraph) performing --; and
Line 63, "print," should read -- print job, --.

UNITED STATES PATENT AND TRADEMARK OFFICE
CERTIFICATE OF CORRECTION

PATENT NO. : 7,253,911 B2
APPLICATION NO. : 10/023750
DATED : August 7, 2007
INVENTOR(S) : Aritomi It is certified that error appears in the above-identified patent and that said Letters Patent is hereby corrected as shown below:

COLUMN 10:
Line 8, "data," should read -- data; --;
Line 9, "material;" should read -- material; and --; and
Line 27, "comprising" should read -- comprising: --.

Signed and Sealed this

Tenth Day of June, 2008

JON W. DUDAS
*Director of the United States Patent and Trademark Office*